United States Patent [19]
Kahn et al.

[11] 3,735,219
[45] May 22, 1973

[54] THERMAL PROTECTION DEVICE FOR LINEAR MOTOR

[75] Inventors: Michael Edwin Kahn, Palo Alto; William Frank Krajewski, Los Altos Hills; Terry Gordon Johnson, San Jose, all of Calif.

[73] Assignee: Memorex Corporation, Santa Clara, Calif.

[22] Filed: Aug. 25, 1971

[21] Appl. No.: 174,809

[52] U.S. Cl. ........................................318/135, 317/13
[51] Int. Cl. ..................................................H02k 41/02
[58] Field of Search ........................318/135, 471, 423; 310/12–14; 317/13; 340/174–175

[56] References Cited

UNITED STATES PATENTS

| 3,531,789 | 9/1970 | Halfhill et al. | 340/174.1 B |
| 3,526,809 | 9/1970 | Obenhaus | 317/13 |
| 3,383,561 | 5/1968 | Thiele | 317/13 |

*Primary Examiner*—D. F. Duggan
*Attorney*—J. William Wigert, Jr., Karl A. Limbach, George C. Limbach et al.

[57] ABSTRACT

Thermal protection apparatus is disclosed for electrical motors and, in particular, for a linear motor as, for example, the type used in magnetic disc recording drive systems. An electrical circuit, the analog of the thermal characteristics of the armature coil, provides electrical signals indicative of the temperature of the armature coil. Safety or protection means responsive to these electrical signals maintains the motor armature coil below a safe, predetermined level, by, in the preferred embodiment, reducing the average power input to the motor.

13 Claims, 1 Drawing Figure

THERMAL PROTECTION DEVICE FOR LINEAR MOTOR

BACKGROUND OF THE INVENTION

The present invention relates to a thermal protection system for electric motors, and in particular to a thermal protection system for linear motors used in magnetic disc drive systems.

A linear positioning motor is used to position the read/write magnetic recording heads in disc magnetic recording systems. Such a motor consists of a stationary permanent magnet surrounding a movable armature coil which is attached to the head positioning carriage. The armature coil can move in or out of the motor through a hole in one end of the motor. Forces required to move the heads from one position to another are generated by passing current through the wires of the coil. The magnetic field associated with this current reacts with the permanent magnetic field, pushing the coil out of the motor or pulling it in, depending on the direction of the current.

A detent mechanism operates in close cooperation with the linear positioning motor. A rack of teeth referred to as the detent rack is on the carriage carrying the magnetic heads. Opposite the rack, mounted on the stationary frame is a detent pawl. Facing the detent rack is a variable reluctance transducer which senses the teeth of the detent rack to determine the position of the carriage on the track frame. The signal from the transducer regulates the seek velocity of the bobbin in the linear positioning motor, initially accelerating the bobbin to high velocity and periodically slowing the bobbin as it approaches an intended reading and writing track, and when the proper address has been reached, deactivates the solenoid holding the spring loaded detent pawl out of lock, thereby dropping the pawl onto the rack locking the carriage in position. This positioning apparatus eliminates as many technical components as possible enabling a high access speed to be employed in the address seek operation while at the same time increasing the effective storage capacity of the discs.

For a more detailed description of a magnetic recording disc drive system, reference is made to U.S. Pat. No. 3,544,980 by R.A. Applequist et al entitled "Magnetic Recording Disc Drive with Heat Positioning and Collision Avoidance Apparatus."

Starting from the time the move is initiated, there is a 2 millisecond delay while the detent pawls are pulled from the rack. Actually the 2 millisecond delay occurs on a forward seek (toward the spindle) only. However, on a reverse seek there is an additional period of 1 to 2 milliseconds at the end of the seek for setting detents. Hence the overall delay time is approximately the same for either a forward or reverse seek. The accelerating part of seek then begins and is followed at the proper time by a period of deceleration. During the deceleration period, current in the armature coil flows in the opposite direction from that during the acceleration period. This is followed by low current periods for setting the detent teeth (approximately 2 milliseconds) and a 4 millisecond period for settling out of vibrations. At the end of this time the disc file is ready to read, write, or more the heads to another position.

During the accelerating and decelerating part of a move, large currents flow in the coil and there is a large amount of heat generated in the coil. The coil thus heats up during these periods. During the remaining 8 milliseconds of the move, very small currents flow in the coil and the coil cools toward the ambient air temperature. During a short move the heating and cooling periods are roughly equal and the coil tends to remain near the ambient temperature. During a long move, however, the heating period is much longer than the cooling period and hence, there is a net temperature rise in the coil.

Repeated cycling of long moves causes the coil temperature to rise to an equilibrium level in which the heat lost during the cooling portion of the cycle balances the heat input during the heating portion of the cycle. Since the rate of cooling is proportional to the difference between the coil temperature and the ambient air temperature, the steady-state temperature increases as the cooling period decreases (since a fixed amount of heat must be lost during the cooling period).

The aggregate effect of these periods of heating and cooling over many cycles can be thought of as being derived from an averaged rate of power input (or power rate) to the coil. As the disc drive becomes faster and faster, the number of cycles possible in a given period of time increases and the power rate increases.

With newer, higher speed disc drive assemblies it has been found that the steady-state coil temperature, when performing repeated long moves with little or no time between cycles, exceeds the safe temperature limits for the materials used in constructing the moving armature.

More particularly, the average rate of power dissipation in the armature, a function of seek length and the interval between seek requests, varies over a wide range. When performing normal data processing tasks, the average seek length is 0.58 in. (for a 2.00 in. maximum seek) and the average time between seeks in one-half the disc revolution time, typically about 25.0 milliseconds in the latest disc packs. The linear motor should be able to tolerate the power dissipation corresponding to these conditions indefinitely without exceeding the thermal limit.

The worst case power dissipation condition is that which occurs when performing repetitive 2.0 in. seeks with no delay between seeks. This condition is rarely encountered in a data processing environment but the system must be capable of handling these seeks without over-heating.

Of course one solution to the problem is to change the materials used in the moving armature. This has one significant drawback, however, in that it means that a present user of a drive system, modified for higher speeds, would require an entirely new linear motor.

Prior art disc drive systems use a bobbin temperature sensor assembly mounted adjacent to the linear motor. This sensor is used to detect catastrophic logic failures which could result in gross overheating of the armature coil. This assembly consists of a thermistor and a coil of the same wire used on the armature coil covering the thermistor. The coil on this assembly is connected in series with the armature coil so that it is subject to the same cycles of heating and cooling as the armature coil.

In order to be effective as a dynamic temperature indicating device for the armature coil, i.e., to act as the thermal analog of the armature coil, the sensor assembly would have to have the same thermal time constant and ratio of heat input to heat transfer coefficient as the armature. In practice this is very difficult and an impractical thing to achieve.

SUMMARY OF THE INVENTION

In accordance with the invention, electrical analog means are used to provide electrical analog signals corresponding to the temperature of the armature coil of a motor, such as a linear motor used in a disc drive assembly. Protection means, responsive to these electrical analog signals, are provided for maintaining the temperature of the armature coil at a predetermined safe limit.

In one embodiment of the invention, used with a linear motor for a disc-type recording drive, the instantaneous power input to the coil is monitored by sensing the voltage drop across a bobbin current sampling resistor. This signal is used to drive and electrical analog circuit modeled to match the thermal capacity and heat transfer characteristics of the armature coil. The output of this circuit is a voltage corresponding to the coil temperature rise above the ambient temperature of the armature coil.

This output voltage is sent to a safety or protection circuit for maintaining the temperature of the coil at a safe, predetermined level. In one embodiment the protection circuit includes a comparator which is set to give a signal whenever the coil temperature exceeds the maximum safe operating temperature. In one embodiment this output delays the access completion signal to the disc drive controller by a predetermined time. In other words, the time interval between coil activation (including accelerating and decelerating periods) is lengthened. Since during this time delay the power dissipation in the coil is very small, the over-all power rate is reduced.

In one embodiment the magnitude of the delay is chosen so that, even under the most severe heating conditions the power rate is maintained at a level which prevents overheating of the coil. Alternatively, the delay time may be variable so that only that amount of delay which is required is utilized.

The temperature, $T$, of the armature coil is given by the following equation:

$$T = T \text{ air} + P/a + [T_o - T \text{ air} - (P/a)]e^{-t/\tau} \quad (1)$$

Where
 $T$ air — ambient temperature
 $P$ = power dissipated in the armature coil, which is equal to:

(armature coil current)$^2$ X coil resistance $a$ = heat transfer constant
 $T_o$ = initial temperature
 $\tau$ = thermal time constant of the armature coil
A change of temperature is given by:

$$T = P/a + (\Delta T_o - P/a) e^{-t/\tau} \quad (2)$$

where $\Delta T$ is the amount by which the armature temperature exceeds the ambient temperature, $T$.

Since equation (2) contains only an initial condition, $\Delta T_o$, and a power dissipation term which is easily measured, the analog circuit of the present invention can be used to give temperature rise. The action of this circuit is essentially "transparent" to the disc file control unit and the computer itself. By this it is meant that the circuit requires no action on the part of the disc file control unit or computer when the predetermined safe operating temperature of the coil has been exceeded. The only external indication of an unsafe temperature is that the seek takes longer, by a delay period, than expected. At the end of this delay, the drive is ready to read, write, or seek to another cylinder without interruption.

The circuit of the present invention allows the linear motor to approach its thermal limit while performing the average seeks described above. The circuit ensures that the thermal limit of the armature is not exceeded when performing repetitive seeks which yield power dissipation rates higher than the power rate of the average seek. It is thus possible to increase the allowable current in a linear motor beyond the value which would result in the thermal limit being reached only under worst case power rate conditions. Consequently, a significant improvement in servo performance is obtained at the cost of only a small amount of electronics and with no increase in the cost of the motor.

BRIEF DESCRIPTION OF THE DRAWINGS

The sole FIGURE.

DESCRIPTION OF THE PREFERRED EMBODIMENTS

Figure 1:
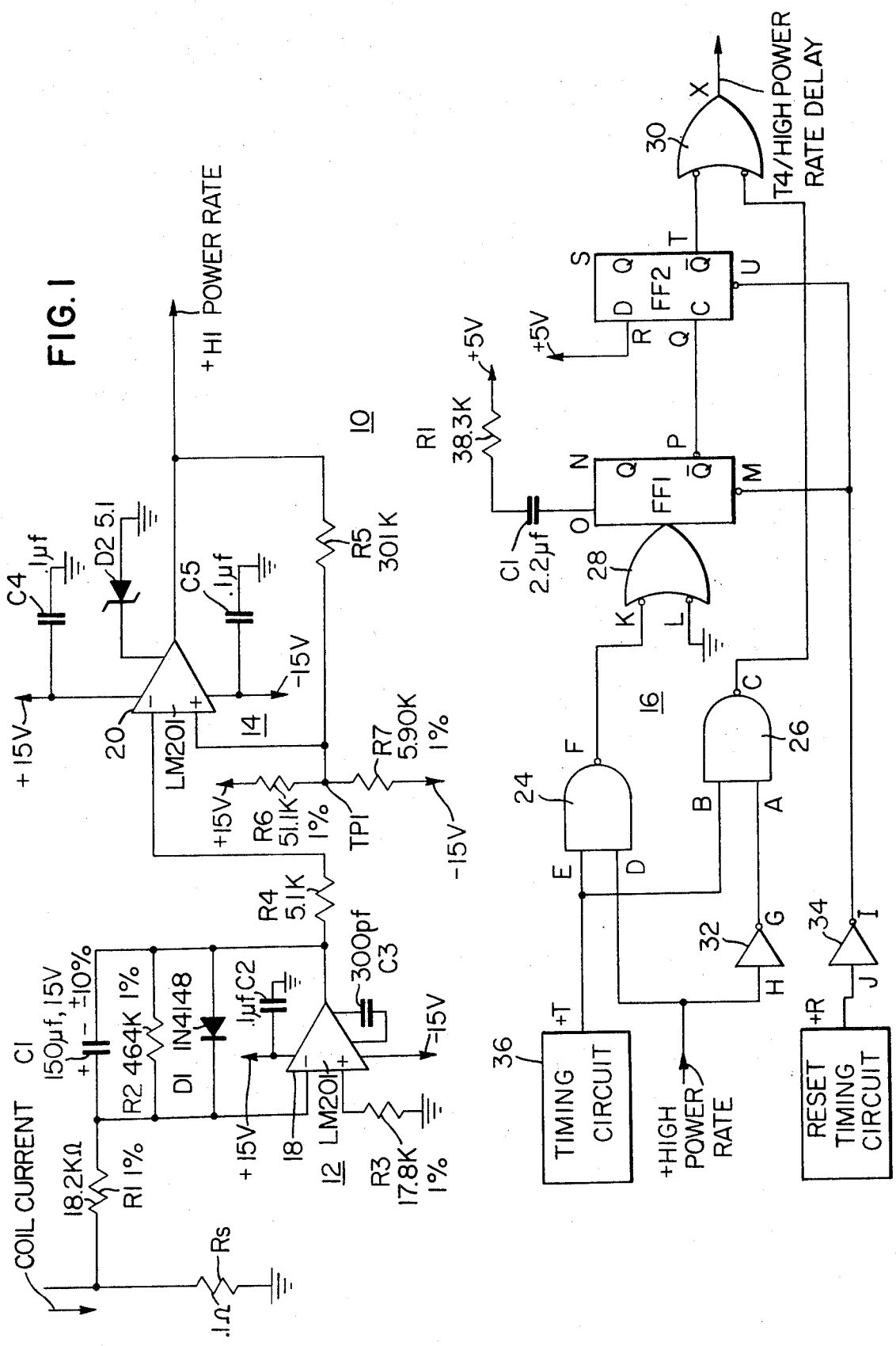
FIG. 1, is an electrical diagram of one embodiment of the present invention.

FIG. 1 illustrates schematically a thermal protection circuit 10 in accordance with the present invention. In the embodiment illustrated, the protection circuit 10 includes an electrical analog circuit 12 which is designed to match the thermal characteristics of the armature coil of the linear motor.

Responsive to the output from the electrical analog circuit 12 is a protection or safety circuit for maintaining the temperature of the coil below a safe maximum operating temperature. This protection circuit includes a comparator circuit 14 and a delay circuit 16. The power dissipated by the armature coil is determined from measurement of the coil current. This is accomplished by means of a sampling resistor RS in series with the coil. The voltage across the sampling resistor RS is fed to one input of a differential amplifier 18 which forms a part of the electrical analog circuit 12. Connected in parallel in a feedback path across the differential amplifier 18 is a capacitor C1 and a resistor R2. The product of the values of these two elements is the time constant of the electrical analog circuit 12 and is chosen to correspond to the thermal time constant in equations (1) and (2) above. Thus the output from the differential amplifier 18 is an electrical signal which corresponds in value to the temperature above the ambient temperature of the armature coil.

Diode D1 protects the capacitor C1. Capacitor C3 provides high frequency stability to the circuit. Resistor R3 is used to balance the input of the differential amplifier 18. The gain of the amplifier 18 is measured by the ratio of R2 to R1.

From the electrical analog circuit 18, the electrical analog signal corresponding to the coil temperature rise is sent to the protection circuit 14, and in particular to the one input of differential amplifier 20. Differential amplifier 20 forms a part of a comparator circuit which also includes resistors R6 and R7 which are connected between positive and negative voltage supplies. With the values of resistors R6 and R7 in FIG. 1, call the voltage to one input of differential amplifier 20 $V_{ref}$. So long as the voltage from the electrical analog circuit 12, which is itself a negative voltage, is more positive than $V_{ref}$ no output is provided from the differential amplifier 20. However, if the temperature of the coil rises above the safe operating temperature, the voltage to the other input of differential amplifier 18 becomes more negative than $V_{ref}$ and an output signal is provided from the differential amplifier 20. This signal has been designated the "+ high power rate" signal. This signal then triggers the protection circuit which will be described subsequently.

A zener diode D2 is provided in the output circuit of the differential amplifier 20. This diode clamps the output voltage of the amplifier 20 to 5.1 volts. This is the value required by the subsequent logic circuitry. Capacitor C4 and C5 provide high frequency stability, and resistor R4 is used to balance the DC input voltages across the input terminals of amplifier 20.

To protect the subsequent logic circuitry and to provide stability to the protection circuit, resistor R5 is put in a feedback path across the amplifier 20. When the high power rate signal is given from differential amplifier 20, i.e., when the voltage from amplifier 18 is more negative than $V_{ref}$, the resistor R5 provides current through resistor R7 which has the result of making the voltage at the input of amplifier 20 less negative than $V_{ref}$. In the embodiment shown, the voltage to the input amplifier 20 rises to about 14 percent. This means that the protection circuit is not deactivated until the temperature of the coil drops somewhat below the predetermined safe operating temperature. This gives stability to the circuit and prevents rapid switching of amplifier 20.

As explained above, if the temperature exceed the maximum safe level, a time delay is provided between activation cycles of the armature coil. In the embodiment illustrated a 25 millisecond delay is added between cycles. This value has been chosen to insure that the temperature of the coil is maintained below the safe operating level even in the worst situation of continuous long seeks by the recording heads.

The delay circuit 16 includes a number of logic elements including a pair of NAND gates 24 and 26, NOR gates 28 and 30, a single-shot FFL, a D-type flip-flop FF2, and inverters 32 and 34. The logic notation used herein to describe the two binary states is a high or plus (+) signal and a low or negative (−) signal. Of course, other logic notations could be used such as 0 and 1.

NAND gates 24 and 26 are characterized by providing a low output only if the inputs are all high. NOR gates 28 and 30 are characterized by providing a high output if any or all inputs are low.

A timing signal T is provided by timing circuit 36. A T signal is given whenever an access cycle of the head has been completed. Thus it is a timing signal to begin the next access cycle. As will be explained, in effect this signal is not allowed to pass through undelayed to the disc drive control whenever there is an armature coil temperature which has exceeded the safe operating temperature, i.e., when there is a + high power rate signal. In the event that there is a high temperature situation, this pulse is in effect, delayed for a period of 25 milliseconds before being sent to the drive control system.

Thus there are two possible situations: when there is no high power rate signal and when there is a high power rate signal. In the former case when the timing signal T is provided from timing circuit 36 a + signal is supplied to terminal E of NAND gate 24 and terminal B of NAND gate 26. Since there is no + high power rate signal the input to NAND gate 24 is negative but the input to terminal A to NAND gate 26 is positive as a result of the inverter 32. With both inputs A and B of NAND gate 26 positive the output C of NAND gate 26 is negative. With a negative input to terminal W of the NOR gate 30 there is a positive output from the NOR gate 30. Thus, in summary, with the occurence of a +T timing signal from circuit 36 and with no + high power rate signal the output from the NOR gate 30 is positive. In effect, then, the timing pulse T is immediately transmitted through the delay circuit to the output of the delay circuit 16 without any delay. This means that the drive mechanism of the heads is free to operate in the normal manner.

In the second condition, i.e., when the temperature of the coil has been exceeded and a + high power rate signal is provided, a positive signal goes to the input D of NAND gate 24 and a negative signal to the input A of NAND gate 26. This means that the output C of NAND gate 26 is positive. Since the normal signal to input V of NOR gate 30 is positive and since, in this case, the output from NAND gate 26 is also positive the output from the NOR gate 30 is negative. Thus in effect, the passage of the timing pulse T is blocked.

The output X from NOR gate 30 stays negative until the output T from flip-flop FF2 is low. This occurs after a 25 millisecond delay as follows. With the inputs D and E of NAND gate 24 both positive, the output from NAND gate 24 F goes low. This starts single-shot FF1 which, after a 25 millisecond delay, caused by the combination of resistor R1 and capacitor C1, triggers flip-flop FF2. When this happens the output T goes low and the output from NOR gate 30, X goes high. When this occurs, the drive system logic permits a read/write seek of the magnetic heads. The net effect of this is that the timing circuit pulse T is delayed by 25 milliseconds.

As explained above, in the embodiment described a single predetermined time delay was selected to provide sufficient delay between coil activation cycles to maintain the coil temperature at a safe level even in the worst heating situations. As an alternate way of accomplishing this, rather than having one single time delay, a shorter incremental time delay such as, for example, 5 milliseconds, might be chosen and then the incremental time delays added together as required in order to have a sufficient total time delay to allow the coil temperature to return to a safe level. The latter embodiment has the advantage that no more time delay is utilized than is required in view of the rate of power inputed to the coils. Thus, for example, where the seek time only brings the temperature of the coil slightly above the safe operating temperature, only a small incremental amount of time delay would be necessary to allow proper cooling. It should be understood that the circuit described in FIG. 1 could easily be modified by those skilled in the art to provide this type of incremental time delay.

Note that various circuit component values have been given in FIG. 1. It should be understood however, that the present invention should not be limited in any way to this or any other specific embodiment. Thus these circuit values have been included only as an illustration of a preferred embodiment. Obviously, other specific embodiments could be constructed in accordance with the basic invention by one skilled in the art.

We claim:

1. In a magnetic disc drive assembly including a linear motor for moving and positioning one or more record/play heads adjacent to one or more recording tracks on one or more magnetic recording discs, said linear motor including a stationary permanent magnet and a movable armature coil forming a bobbin, and control means for controlling the linear position of said bobbin, and wherein the improvement comprises:
   a. electrical analog means having an electrical input and an electrical output and circuit means connected between said input and output having a time response matched to the time response of the heat transfer characteristics of said armature coil for providing electrical analog signals corresponding to the temperature of the armature coil with the input of said electrical analog means connected to said coil for sensing the non-thermal electrical conditions in said coil; and
   b. protective means connected to the output of said electrical analog signals for maintaining the temperature of the armature coil below a predetermined limit.

2. Magnetic disc drive assembly as in claim 1 wherein said circuit means of said electrical analog means comprises:
   a. means for monitoring the power input to said armature coil;
   b. an electrical circuit providing an analog of the thermal characteristics of said armature coil, said electrical circuit being responsive to said monitoring means for providing electrical signals corresponding to the temperature of said armature coil.

3. Magnetic disc drive assembly as in claim 2 wherein said protection means comprises means for reducing the average power input to said armature coil.

4. Magnetic disc drive assembly as in claim 3 wherein said power reducing means comprises means for increasing the time duration between armature coil activation cycles.

5. Magnetic disc drive assembly as in claim 4 wherein the time duration is a length of time selected to permit sufficient cooling so that the temperature of the coil stays below said predetermined limit even in the worst heating situations.

6. Magnetic disc drive assembly as in claim 1 wherein said protection means comprises means for reducing the average power input to said armature coil.

7. Magnetic disc drive assembly as in claim 2 wherein said power reducing means comprises means for increasing the time duration between coil activation cycles.

8. Magnetic disc drive assembly as in claim 4 wherein the time duration is a length of time selected to permit sufficient cooling so that the temperature of the coil stays below said predetermined limit even in the worst heating situations.

9. Thermal protection apparatus for a motor having an armature coil comprising:
   a. means for monitoring the input power to said motor;
   b. electrical circuit means having an electrical input and an electrical output and circuit means connected between said input and output having a time response matched to the time response of the heat transfer characteristics of said armature coil for providing an electrical analog of the thermal characteristics of said armature coil, said circuit means being responsive to said monitoring means for providing electrical signals indicative of the temperature of said coil, and
   c. safety means responsive to said temperature signals for maintaining the temperature of said coil below a predetermined safe level.

10. Thermal protection apparatus as in claim 9 wherein said safety means includes means for reducing the average input power to said motor.

11. Thermal protection apparatus as in claim 9 wherein said monitoring means comprises means for sampling the motor armature current.

12. Thermal protection apparatus as in claim 10 wherein said motor is a linear motor having a movable armature coil which is periodically energized for linear positioning, and wherein said power reducing means comprises means for increasing the time duration between coil activation cycles.

13. Thermal protection apparatus as in claim 12 wherein the time duration is a length of time selected to permit sufficient cooling so that the temperature of the coil stays below said predetermined limit even in the worst heating situations.

* * * * *